United States Patent
Merkle et al.

(10) Patent No.: US 9,781,948 B2
(45) Date of Patent: *Oct. 10, 2017

(54) PROCESS TO PREPARE A PREMIUM FORMULATED EGG PRODUCT

(71) Applicant: Michael Foods of Delaware, Inc., Minnetonka, MN (US)

(72) Inventors: Jonathan A. Merkle, Cologne, MN (US); Hershell R. Ball, Salisbury, NC (US); Jason W. Mathews, Gaylord, MN (US)

(73) Assignee: Michael Foods of Delaware, Inc., Minnetonka, MN (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/485,738

(22) Filed: Sep. 14, 2014

(65) Prior Publication Data

US 2015/0079247 A1 Mar. 19, 2015

Related U.S. Application Data

(60) Division of application No. 13/537,172, filed on Jun. 29, 2012, now Pat. No. 8,834,952, which is a
(Continued)

(51) Int. Cl.
| | |
|---|---|
| *A23L 1/32* | (2006.01) |
| *A23B 5/04* | (2006.01) |
| *A23B 5/045* | (2006.01) |
| *A23P 30/10* | (2016.01) |
| *A23L 15/00* | (2016.01) |

(52) U.S. Cl.
CPC ............ *A23L 1/3204* (2013.01); *A23B 5/04* (2013.01); *A23B 5/045* (2013.01); *A23L 15/00* (2016.08);
(Continued)

(58) Field of Classification Search
CPC ......... A23B 5/04; A23B 5/045; A23L 1/0073; A23L 1/3204; A23L 1/32; A23L 1/3212;
(Continued)

(56) References Cited

U.S. PATENT DOCUMENTS 3,704,663 A * 12/1972 Shull .................. A47J 37/10
99/347
3,941,892 A * 3/1976 Glasser .................. A23L 15/10
426/104
(Continued)

FOREIGN PATENT DOCUMENTS

JP 10146170 * 6/1998

OTHER PUBLICATIONS

Translation for JP 10146170 published Jun. 1998.*

*Primary Examiner* — Anthony Weier
(74) *Attorney, Agent, or Firm* — Zollinger & Burleson Ltd.

(57) ABSTRACT

The present invention relates to the formulation and process for preparation of a fried egg product that may be frozen for future heating in a microwave or other oven or griddle, for consumption by an individual. Various ingredients are added and mixed to each of the liquid egg white and liquid egg yolk portions. The liquid egg white portion is preheated and then deposited within a mold for slow cooking under controlled temperature and humidity conditions. The liquid egg yolk portion is preheated and then added to the mold for placement on the egg white portion. Following a short period of cooking, the mold containing the formulated fried eggs is transported to a freezer unit for freezing, then is removed from the mold for packaging and storage. At a future time, the frozen formulated fried egg product may be thawed and reheated for consumption by an individual.

20 Claims, 2 Drawing Sheets

Related U.S. Application Data continuation of application No. 12/762,494, filed on Apr. 19, 2010, now Pat. No. 8,211,488, which is a continuation of application No. 11/971,011, filed on Jan. 8, 2008, now Pat. No. 7,709,039, which is a continuation of application No. 11/150,034, filed on Jun. 10, 2005, now Pat. No. 7,338,681, which is a continuation of application No. 10/161,046, filed on May 31, 2002, now abandoned.

(60) Provisional application No. 60/342,405, filed on Dec. 21, 2001.

(52) U.S. Cl.
CPC .............. *A23L 15/20* (2016.08); *A23L 15/30* (2016.08); *A23P 30/10* (2016.08)

(58) Field of Classification Search
CPC .......... A23L 15/00; A23L 15/20; A23L 15/30; A23P 30/10
See application file for complete search history.

(56) References Cited

U.S. PATENT DOCUMENTS

| | | | | |
|---|---|---|---|---|
| 4,488,479 A | * | 12/1984 | Sloan | A47J 37/10 126/380.1 |
| 4,862,790 A | * | 9/1989 | Platteschorre | A21B 1/46 99/353 |
| 4,889,741 A | * | 12/1989 | Timmons | A23L 15/10 426/113 |
| 7,288,279 B2 | * | 10/2007 | Merkle | A23B 5/04 426/614 |
| 7,338,681 B2 | * | 3/2008 | Merkle | A23B 5/04 426/614 |
| 7,709,039 B2 | * | 5/2010 | Merkle | A23B 5/04 426/614 |
| 7,951,411 B2 | * | 5/2011 | Merkle | A23B 5/04 426/614 |
| 8,211,488 B2 | * | 7/2012 | Merkle | A23B 5/04 426/614 |
| 8,834,952 B2 | * | 9/2014 | Merkle | A23B 5/04 426/300 |

* cited by examiner

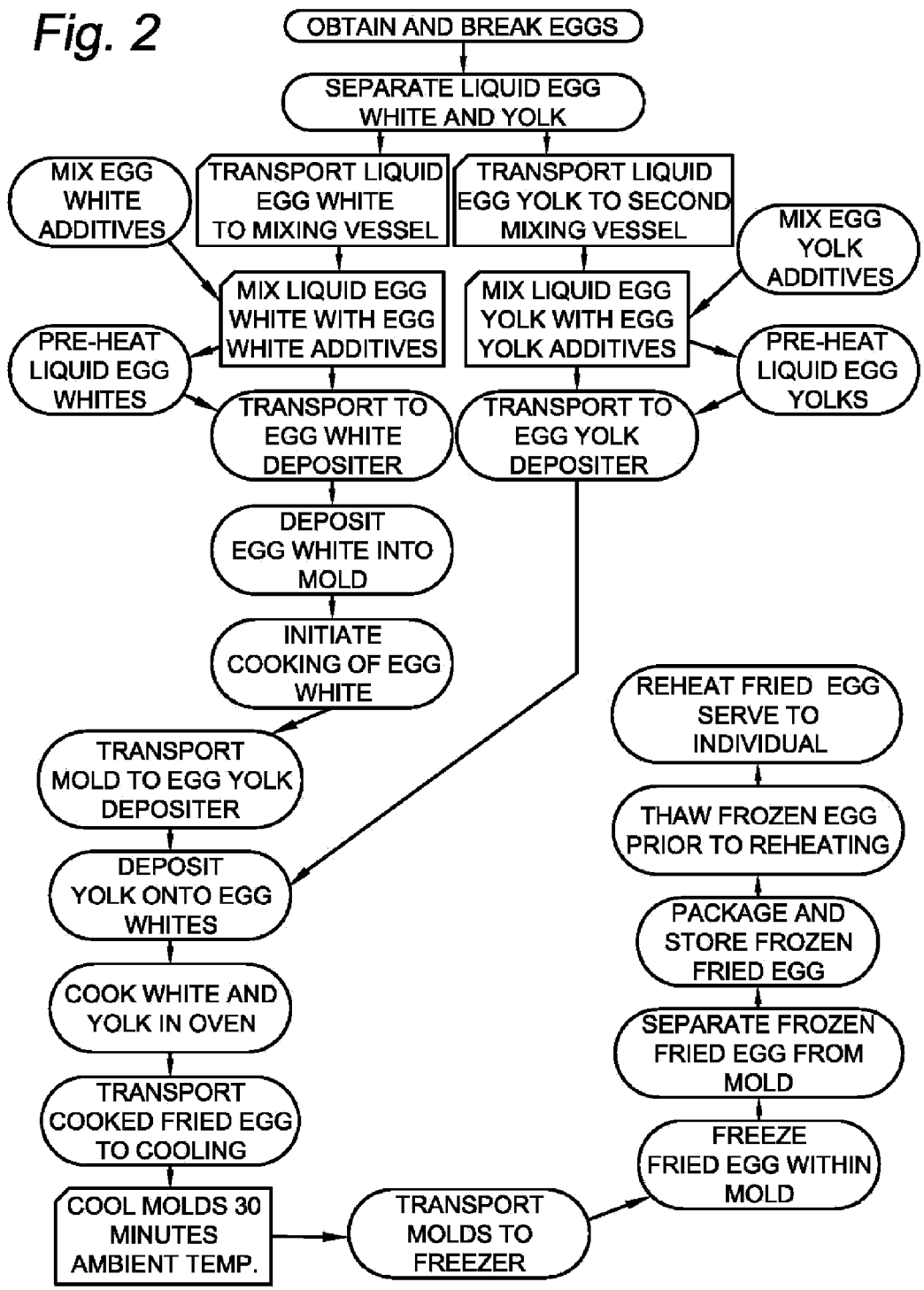

PROCESS TO PREPARE A PREMIUM FORMULATED EGG PRODUCT

CROSS-REFERENCE TO RELATED APPLICATIONS

This application is a division of U.S. patent application Ser. No. 13/537,172, filed Jun. 29, 2012, and now issued as U.S. Pat. No. 8,834,952, which is a continuation of U.S. patent application Ser. No. 12/762,494, filed Apr. 19, 2010, and now issued as U.S. Pat. No. 8,211,488, which is a continuation of U.S. patent application Ser. No. 11/971,011, filed Jan. 8, 2008, and now issued as U.S. Pat. No. 7,709,039, which is a continuation of U.S. patent application Ser. No. 11/150,034, filed Jun. 10, 2005, and now issued as U.S. Pat. No. 7,338,681, which is a continuation of U.S. patent application Ser. No. 10/161,046, filed May 31, 2002, and now abandoned, which claims the benefit of U.S. provisional patent appl. No. 60/342,405, filed Dec. 21, 2001, the entire contents of all identified applications being incorporated herein by reference.

BACKGROUND INFORMATION

The present invention is directed to a formulation for a fried egg product and process to prepare a premium formulated fried egg for consumption by an individual. It is anticipated that the formulated fried egg product will be refrigerated and/or frozen for future heating by microwave oven, convection oven or griddle for consumption as a stand-alone food item or as a portion of a composite food article. The formulated fried egg has a texture and other sensory perceptions similar to a naturally fried egg.

In the past, formulated fried eggs have been formed by the filling of a mold with a liquid egg mixture and then cooking the liquid egg mixture within the mold. Many problems have arisen through the implementation of this processing methodology, resulting in products that have the appearance and taste of commercial processing, products that are extremely dense and have poor viscosity, and products that generally exhibit undesirable sensory perceptions related to the appearance, taste and texture as compared to a freshly fried egg. Therefore, a need exists to eliminate the dense, commercial-processing appearance and taste associated with a formulated fried egg product cooked within a mold.

In the past, procedures have generally not been implemented to rigorously control the processing and cooking parameters utilized to yield a formulated fried egg. A need exists to develop a formulated fried egg that is more appealing in appearance and taste and that is susceptible to freezing and reheating using conventional or microwave heating prior to consumption.

In the past, the freezing and/or extended refrigeration of a formulated fried egg has led to a loss of a cohesive texture and degradation of other sensory attributes such as mouth feel, taste, elasticity, and/or the food product not being tender or appealing to an individual. Another common problem encountered during delayed consumption, extended refrigeration and/or freezing of a formulated fried egg is that the food product exhibits syneresis, or the loss of water, either when frozen and reheated, or when stored for an extended period of time.

In the past, temperature variations during the cooking procedure for formulated fried eggs have caused a degradation of viscosity, loss of elasticity, and have resulted in a non-smooth, non-cohesive texture. In addition, temperature variations have caused the formulated fried egg to lack the tenderness of a naturally fried egg, and to fail to easily fracture and break during attempts to rupture the egg yolk portion. The cooking of the formulated fried egg at an elevated temperature, to minimize the duration of the cooking time, frequently results in burning and degradation of the texture of the formulated fried egg. Also, during rapid cooking a formulated fried egg easily dehydrates and forms a crust that is unappealing to an individual.

The rate of cooking of the formulated fried egg and the temperature of the oven or other cooking device, also frequently cause the formation of an excessive volume of air bubbles, which, in turn, interrupt the structure and texture of the formulated fried egg. The absence of a smooth cohesive texture causes an undesirable mouth feel when consumed by an individual. The existence of undesirable and/or excessive air bubbles may also occur when the pH of the formulated fried egg is at an improper level, preventing the egg white from retaining carbon dioxide as carbonic acid. The reduction in the amount of carbon dioxide and/or carbonic acid causes the mixing and/or shearing of the egg white during processing due to undesirable gas entrapment.

In the past, the cooking of formulated fried eggs has frequently caused an iron-sulfide greening reaction resulting in undesirable coloration and degradation in the taste of the egg product.

It is also desirable to provide a formulated fried egg that is natural in appearance. In the past, formulated fried eggs have been symmetrical, with the egg yolk portion centrally positioned within a substantially round egg white portion. These types of formulated fried eggs do not appear to be natural. Natural fried eggs have random yolk positioning and non-symmetrical egg white portions.

The known formulated fried egg processing techniques frequently cause freezing and/or thawing damage to the product and fail to retain the egg yolk portions in a semi-liquid state after freezing and subsequent thawing and heating. As a result, the egg yolk portions of the known formulated fried eggs do not readily fracture, do not feature a semi-liquid state, and do not have the desired elastic texture.

BRIEF DESCRIPTION OF THE INVENTION

The present invention relates to the formulation and process for preparation of a fried egg product that may be refrigerated and/or frozen for future heating by microwave or other oven or griddle for consumption by an individual. The process involves the initial step of acquisition of liquid eggs which may be separated into liquid egg white and liquid egg yolk portions. Various ingredients are added and mixed into each of the liquid egg white and liquid yolk portions. The liquid egg white portion is preheated and then deposited within a mold for slow cooking under controlled temperature and humidity conditions. The liquid yolk portion is preheated and then is added to the mold for placement on the egg white portion. Following a short period of cooking, the mold containing the cooked egg white and egg yolk is cooled and then transported to a freezer unit for freezing. The frozen formulated fried egg is then separated from the mold for packaging and storage. At a future time, the frozen formulated fried egg product may be retrieved for thawing and cooking for consumption by an individual. The formulated fried egg product made according to the parameters described herein yields an enhanced fried egg product having the sensory attributes and appearance of a naturally fried egg.

The liquid egg white portions, the liquid yolk portions and the additional ingredients are individually mixed under controlled conditions to avoid over-mixing and/or over-gassing of the liquid egg portions, which would adversely affect the quality of the end product. Following cooling and freezing, the formulated fried egg may be separated from the mold for storage within a freezer, or it can be refrigerated for future reheating and consumption by an individual.

Principle advantages of the present invention are: improved texture; a natural, homemade look for the reheated fried eggs; preparation through the use of commercially available equipment; a light and airy texture resembling naturally fried eggs; a more appetizing appearance; use of relatively simple and inexpensive ingredients and processing equipment that fulfill the intended purpose of enhancing the formulated fried egg product without damage to the food article and/or damage to food processing equipment and/or illness to individuals; the addition of modified food starch to enhance the quality of the food article; the addition of gums to improve the appeal of the food article; the use of FDA-approved ingredients; efficient control of the mixing and cooking parameters to formulate a desired quantity of formulated fried egg product; a product that may be held as frozen, refrigerated, and/or hot for extended periods of time without loss of product integrity, thereby minimizing waste; a superior formulated fried egg product that includes integrity characteristics not found in other food articles within the same product classification; enhanced product consistency that is not found in other food articles within the same product classification; a formulated fried egg product that remains intact following refrigeration and/or freezing and subsequent reheating for consumption by an individual; improved texture and flavor as compared to other food articles within the same product classification; and minimized sogginess of the egg product from refrigeration and/or freezing and subsequent reheating prior to consumption by an individual.

BRIEF DESCRIPTION OF THE SEVERAL VIEWS OF THE DRAWINGS

FIG. 2 shows is a block diagram showing the processing steps during the formation of the fried egg product.

DETAILED DESCRIPTION OF THE INVENTION

Figure 1:
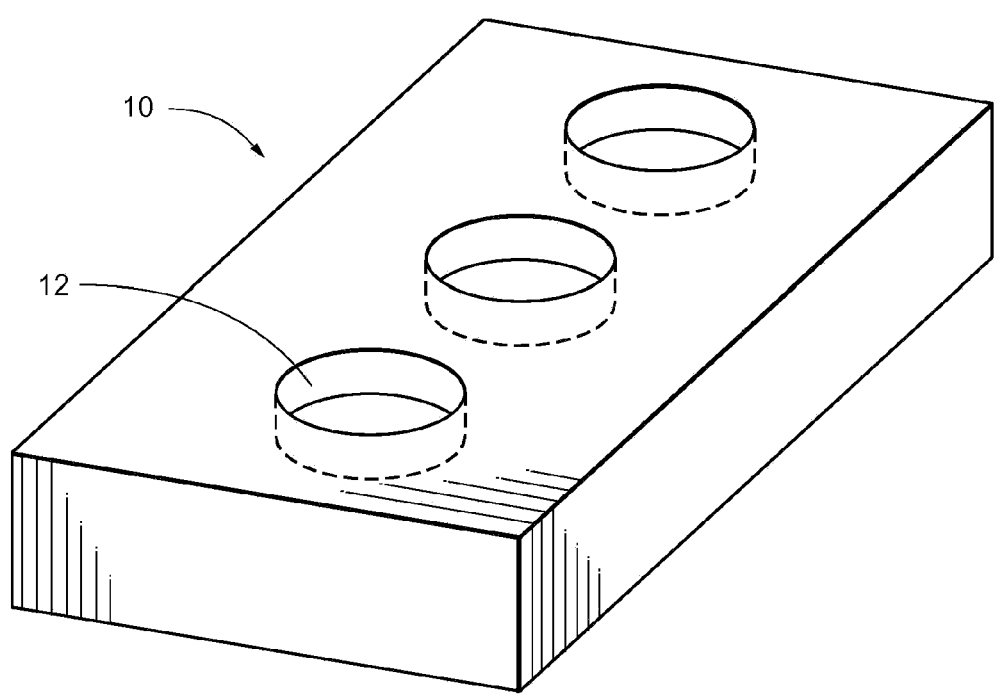
FIG. 1 shows a mold utilized to cook the formulated fried egg.

In general, the disclosed invention relates to a formulated fried egg product, and a process to prepare the formulated fried egg product. The formulated fried egg product is generally formed of an egg white portion and an egg yolk portion.

After being cooked, it is preferable that the formulated fried egg product is frozen, thawed, and heated prior to consumption by an individual and/or prior to incorporation into a composite food product.

The disclosed formulation for the fried egg product, and process to prepare the formulated fried egg product, originate with liquid egg whites and liquid egg yolks which, when cooked and combined with other ingredients, may be frozen and/or refrigerated for reheating by microwave ovens, convection ovens, griddles or any other type of heating device without limitation, for consumption as a fried egg or as a component of a consumable food product. The formulated fried egg may include a wide range of egg product and ingredient formulations, which when mixed, frozen and/or refrigerated, followed by reheating, result in a visually and sensorially appealing formulated fried egg.

The process for forming the fried egg product for future reheating by a microwave oven or other heating oven or griddle is distinctly different in certain physical characteristics from standard processing techniques.

Ordinarily one would not expect the control of ingredients, the regulation of temperature, the control of cooking conditions, and the management of mixing parameters during food processing to yield an enhanced formulated fried egg product. However, the failure to control ingredient proportions, regulate the temperature of the ingredients, control the conditions of cooking, and/or follow mixing parameters significantly degrades the integrity of sensory and taste perceptions for the fried egg product. Control of ingredient proportions, regulation of the temperature of the ingredients, control of cooking conditions, and management of mixing parameters provide enhanced consistency and integrity for the formulated fried egg product and reduce sogginess, enhancing the likelihood that the formulated fried egg will remain intact through processing, freezing or refrigeration, and subsequent reheating prior to consumption by an individual. The control of ingredient proportions, regulation of ingredient temperature, limitation of cooking conditions, and management of mixing parameters also maximize the retention of a cohesive texture and sensory perceptions associated with a composite formulated fried egg product.

The formulations and food processing techniques described herein minimize undesirable effects of the fried egg being rubbery, or exhibiting syneresis (loss of water) either when frozen and reheated, or when stored for an extended period of time.

The formulations and food process techniques described herein further minimize waste of the consumable formulated fried egg.

The present methodology for formulation of the fried egg product occurs through the acquisition of farm packaged, ungraded, washed, fresh eggs, where the egg whites have been separated from the egg yolks by hand or mechanical egg-shelling techniques. Care should be utilized to avoid overgassing of the egg white component of the formulated fried egg during mechanical egg-shelling and separation techniques. The liquid egg white and/or liquid egg yolk portions of the formulated fried egg may be obtained from shell eggs and/or pasteurized shell eggs. It is desirable for the liquid egg yolk portion of the formulated fried egg to be semi-solid following cooking and reheating after being frozen. Dried egg white powder and/or egg yolk powder may be added to the liquid egg yolk portion to improve the density, texture, and mouth feel for the egg yolk portion of the formulated fried egg.

The liquid egg whites, separated from the liquid egg yolks, form the starting materials for the formulated fried egg product. In general, the liquid egg whites may be unpasteurized or pasteurized for use as the starting material.

First, the starting liquid egg whites are maintained in a suitable container and may be refrigerated for later mixing with supplements to provide a superior taste, appearance and texture for the formulated fried egg. Preferably, the liquid egg whites are not stored as refrigerated but are immediately used for processing into the formulated fried egg.

The formulated fried egg product preferably has the physical and chemical characteristics of a natural fried egg and is sensorially acceptable as a formulated fried egg product in substitution for a standard natural fried egg.

In general, the process for formulation of the fried egg includes: obtaining a desired amount or volume of liquid egg whites and liquid egg yolks and placing them into separate mixing tanks or vessels. In a third separate tank, "dry ingredients" including, but not necessarily limited to, oils; gums and modified food starches; non-fat dry milk; salt; water and citric acid may be placed. The "dry ingredients" are then mixed, preferably separately from the egg ingredients. The mixed "dry ingredients" may then be introduced into the respective vessels containing liquid egg whites and/or liquid egg yolks whereupon further mixing should occur. Alternatively, the applicable "dry ingredients" may be directly mixed in the individual vessels containing the liquid egg whites and/or the liquid egg yolks.

Mixing may occur through the use of an Admix High Shear Mixer for a desired period of time, which may be five minutes at a speed of 3450 rotations per minute, resulting in a homogeneous liquid egg white and/or egg yolk product. Mixing may result in the formation of a foam that is preferably removed from the liquid egg white and/or liquid egg yolk mixture. Alternatively, the ingredients for the liquid egg whites and liquid egg yolks may be mixed for approximately 5 to 10 minutes and then the mixed liquid egg whites and liquid egg yolks may be pumped through commercial processing equipment for deposit into a mold for cooking in a commercial convection oven. Alternatively, the liquid egg whites and/or liquid egg yolks may be mixed through constant stirring for a desired period of time whereupon the mixed liquid egg whites and liquid egg yolks may be pumped into the depositor for further processing. Alternatively, the mixed liquid egg whites and/or liquid egg yolks may be homogenized through commercially available homogenizing equipment. It is also generally desirable to avoid excessive mixing or agitation of the liquid egg whites and/or liquid egg yolks that may result from the use of powerful mixing equipment. Excessive mixing causes aeration within the liquid egg product, resulting in the formation of air bubbles during cooking of the formulated fried egg. Excessive agitation may further cause the degradation of the egg whites and/or egg yolks, adversely affecting the quality of the formulated fried egg product.

The ingredients of the liquid egg white and/or liquid egg yolk may be mixed within a Kramer & Grebe multi-mix mixer. Alternatively, the liquid egg whites and/or liquid egg yolks may be mixed within a Hobart blender. The mixed liquid egg whites may then be placed within individual molds by a Koppens dispensing machine, which may regulate the desired volume of the mixed liquid egg whites within each individual mold.

The mixed liquid egg whites may then be pumped for preheating within a heat exchanger. The mixed liquid egg yolks may also be pumped for preheating within a second heat exchanger. The preheated liquid egg white product may then be pumped into a depositor. The preheated liquid egg yolk product may then be pumped into a second depositor. Finally, the preheated liquid egg whites are deposited in a mold for cooking. Following an initial period of cooking, the egg yolk portion is deposited upon the partially cooked egg white portion within the mold. Further cooking of the egg white and egg yolk portions normally follows by passing the molds through a convection oven. The cooked fried eggs are then cooled, frozen, and removed from the molds for appropriate storage and/or for reheating and inclusion within a food product such as breakfast sandwich.

Alternatively, the process for formulation of a fried egg product may include obtaining a desired amount or volume of unshelled liquid egg whites, and egg yolks. The liquid egg whites and yolks are placed into separate mixing tanks for mixing with initial ingredients such as oils, gums, modified food starches, salt, and water. Next, the liquid egg whites and liquid yolks may be pumped to a heat exchanger for preheating. Next, the mixed liquid egg whites and liquid egg yolks may be pumped to respective depositors, whereupon a desired amount of preheated liquid egg whites are deposited within molds. The mold then passes a second depositor containing the liquid egg yolks for depositing of the liquid egg yolk portion into the mold on top of the uncooked liquid egg white portion. The molds containing the liquid egg whites and liquid egg yolks then pass into an oven for cooking The cooked formulated fried eggs are then cooled, frozen, and removed from the molds for appropriate storage and eventual use as a food product.

Initial homogenizing of the liquid egg whites and/or liquid egg yolks may occur provided that the homogenizing methods do not significantly delay the continued cooking of the mixed liquid egg whites and/or liquid egg yolks. Preferably, the mixed liquid egg whites and liquid egg yolks are cooked within a few hours of mixing. It is more preferable that cooking occurs immediately following the mixing of the liquid egg whites and liquid egg yolks.

Citric acid and/or citric acid in combination with xanthan gum may be added to the liquid egg yolk. The citric acid slows the iron sulfide-generating reaction during cooking and improves the appearance of the egg yolk while simultaneously increasing the viscosity of the egg yolk at lower cooking temperatures.

It is desirable for the egg white portion following cooking to be elastic, smooth, cohesive in texture, tender and to fracture so as to give the appearance of the egg white portion of a naturally fried egg. To achieve egg white consistency, minimization of air bubbles is required to reduce cupping, graininess, and freezer/thaw degradation. In order to assist in the improvement of the consistency and texture of the egg white portion, POLAR GEL modified food starch and/or PURITY modified food starch may be added. POLAR GEL starch in most applications provides slightly better texture and consistency for the cooked egg white portion of the formulated fried egg. The use of POLAR GEL starch at a level of approximately 1.5% also provides adequate freezer/thaw protection for the formulated fried egg. In addition, the texture and/or appearance of the egg white portion or yolk portion may be influenced by the type of gum that is added to the formulated fried egg. To improve texture and/or appearance, guar and/or xanthan gum provide acceptable results upon cooking of the formulated fried egg. The texture and/or appearance of the formulated fried egg following cooking is improved through the addition of a combination of modified food starch and gum. The use of excessive modified food starch should be avoided to minimize perceived rubberiness and undesirable mouth feel for the formulated fried egg. The use of xanthan gum also improves the mouth feel characteristics for the formulated fried egg following cooking.

In order to minimize undesirable bubbling, particularly within the egg white portion, a procedure may be implemented to de-gas and to remove air bubbles from the liquid egg whites. A vacuum treatment may be introduced for a period of approximately two hours in order to attempt to draw air bubbles to the surface of the liquid egg whites. Air bubbles may float to the surface of the liquid egg whites following depressurizing of the container holding the liquid egg whites. Initially, machine-broken egg whites are more susceptible to bubble formation than hand-broken eggs.

Separation of the egg whites from the hand-broken eggs generally yields intact egg magma, minimizing undesirable air bubble formation.

The pH of the liquid egg white portion is normally between 8.2 to 8.5. An increase in the pH of the liquid egg white portion to a level between 8.8 and 9.1 decreases the volume of air bubbles and reduces the cupping of the egg white portion during cooking. Further, an increase of the pH to approximately 9 for the liquid egg white portion results in greater freezer/thaw protection, reducing damage to the formulated fried egg following cooking and subsequent freezing.

The use of 1.0 mL of 1.0 N NaOH (40 g/960 mL water) at approximately 1.0 mL NaOH solution to 100 mL of liquid egg whites increases the pH from approximately 8.4 to 8.8. The greatest effect of bubble and cupping reduction for the liquid egg whites occurs when the pH is approximately 9.0 accompanied by a low percentage of modified food starch and xanthan gum.

In general, the ingredients for the egg white portion and the egg yolk portion are not required to be combined in any preferred order for mixing. The ingredients of the egg white portion and the egg yolk portion are preferably mixed cold at a temperature between 32° F. and 40° F. (0° C. and 4.44° C.) and more preferably less than 40° F. (4.44° C.). Water may be added to the "dry ingredients" to facilitate mixing. The "dry ingredients" and water may then be mixed into the respective liquid egg whites and/or liquid egg yolks to formulate the individual core components for the formulated fried egg product. The mixing time for the respective egg whites and/or egg yolk portions is reduced to a minimum and generally is no longer than necessary to insure adequate mixing. The mixing may occur through the use of a high shear mixer as is commercially available.

After mixing of the liquid egg whites and/or liquid egg yolks, a preheating step may occur prior to the cooking of the fried egg product. In operation, the preheating phase is generally continuous for the enhanced mixed liquid egg whites and liquid egg yolks. Preheating occurs as the liquid egg white mixture and liquid egg yolk mixture are pumped through respective sets of equipment for introduction to a tube-to-tube heat exchanger for each mixture. The temperature of the enhanced liquid egg white mixture and liquid egg yolk mixture prior to the respective tube-to-tube heat exchangers is approximately 40° F. (4.44° C.).

The temperature of the enhanced mixture of liquid egg whites and liquid egg yolks exiting the respective tube-to-tube heat exchangers and/or respective scraped-surface heat exchangers following completion of preheating is approximately 135° F. (57.22° C.). The preheating phase elevates the temperature of the enhanced liquid egg white mixture and liquid egg yolk mixture prior to the introduction of the liquid egg white mixture and/or liquid egg yolk mixture into respective depositors. The preheating of the mixed liquid egg whites and mixed liquid egg yolks may occur within individual tube-to-tube heat exchangers identified as a Feldmeier systems.

In addition, the preheating procedure may continue through the use of scraped-surface heat exchangers, which may be identified as Contherm Swept Surface Heat Exchangers. It should also be noted that the preheating may be eliminated and/or significantly reduced so long as cooking times and temperatures are correspondingly adjusted for cooking of the enhanced formulated fried egg at a sufficiently low temperature and for a sufficiently short duration of time to avoid burning, sticking, and/or other undesirable complications associated with the cooking process. Undesirable complications include, but are not necessarily limited to, excessive bubbling where the liquid egg whites and/or liquid egg yolks have not been previously preheated, formation of an undesirable skin for the fried egg, and the undesirable hardening of the egg yolk portion; undesirable skin formation usually occurs when the formulated fried egg is exposed to excessive temperature and/or cooking time.

During and/or immediately following preheating, the mixed liquid egg whites are preferably pumped and/or passed through the depositor for the delivery of a specific weight or volume of mixed liquid egg whites into a mold at a set rate. The speed or rate of the depositor may be adjusted dependent upon the temperature of the oven and cooking time. The speed of the depositor is the rate at which a mold is filled with mixed liquid egg white for movement through an oven. The molds filled with the liquid egg whites may then be passed through a second depositor which contains the preheated liquid egg yolks. The second depositor then deposits a desired volume of preheated liquid egg yolk material upon the previously dispensed egg whites. The placement of the egg yolk material onto the egg whites is not standardized or uniform, thereby enhancing the natural appearance for the formulated fried egg product. Following the deposit of the preheated liquid egg yolk material into the partially filled mold containing the egg whites, the mold may be transported to an oven for cooking.

During formation of the formulated fried egg following preheating of the egg white portion, deposit of the egg white portion within the mold, and/or the initiation of the cooking of the egg white portion, the liquid egg yolk portion is heated to a temperature just below the coagulation point for the liquid egg yolk. The heated egg yolk is then deposited into the mold upon the preheated egg white portion. The position of the egg yolk portion upon the egg white portion is generally not symmetrical and/or uniform between individual portions of the formulated fried egg. The mold containing the egg yolk and egg white portions is then cooked increasing the viscosity of the egg white and egg yolk portions.

A conveyor and/or an extractor device preferably places an empty mold and retrieves a filled mold from the Koppens dispenser. The conveyor preferably transports molds filled with liquid egg white material to a second depositor or dispensing machine for receipt of a portion of liquid egg yolk material. The conveyor continues to transport the molds containing the liquid egg white and liquid yolk material into a convection oven for heating.

The conveyor also preferably transports individual cooked formulated fried eggs to a freezing and package stage where one or more of the individual formulated fried eggs may be packaged together.

The humidity of the oven is an important factor during cooking of the formulated fried egg. Increased humidity within the oven enhances the sensory perceptions such as appearance, taste, and mouth feel for the cooked formulated fried egg. Cooking of the formulated fried egg product therefore occurs at a high moisture atmosphere at an approximate temperature of 350° F. or 176.67° C. A gas fired steam injection cooker as available from Hobart is adequate for the cooking purposes. In addition, in order to obtain a desired high moisture atmosphere, the exhaust dampers for the oven may be required to be closed. Closing of the oven dampers may necessarily increase the temperature within the ovens by approximately 25° F. or 13.89° C. or more. It is anticipated that the minimum temperature of the oven is required to exceed 165° F. or 73.89° C. The oven is preferably completely preheated in order to attempt to obtain an equilibration of the cooking components.

The condition of the oven during the initial cooking of the formulated fried egg, and the condition of the oven during reheating of the formulated fried egg following freezing, have a large impact upon skin formation and egg texture. To minimize undesirable skin formation and to maximize the texture, taste, mouth feel, and other sensory perceptions, the formulated fried egg should be cooked slowly at relatively low temperatures. In addition, humidity within the oven should be maximized. The speed of cooking the formulated fried egg significantly impacts the final textural properties as perceived by consumers. Cooking the formulated fried egg too rapidly and at an increased temperature causes air bubbles to form and interrupt the egg structure, particularly the egg white structure, destroying the smooth cohesive texture of the formulated fried egg.

The oven conditions during cooking may vary. Generally, cooking of the formulated fried egg may occur at a temperature of 325° F. (162.78° C.) at a full-steam setting where the cooking time is 7.75 minutes. These cooking conditions provide an acceptable cooked formulated fried egg.

Alternatively, cooking of the formulated fried egg may occur at a temperature of 375° F. (190.56° C.) at full steam for 6.5 minutes to yield an acceptable cooked formulated fried egg.

In another embodiment, cooking of the formulated fried egg may occur at a temperature of approximately 375° F. (190.56° C.) for 6.5 minutes where full steam is provided for the final one-third of the cooking time to yield an acceptable cooked formulated fried egg.

In yet another embodiment, cooking of the formulated fried egg may occur at a temperature of approximately 425° F. (218.33° C.) for 5.5 minutes where full steam is provided during the entire cooking duration to yield an acceptable cooked formulated fried egg.

A PROCTOR oven may be utilized to cook for the formulated fried egg. Alternatively, a batch oven may be utilized to cook the formulated fried egg. The cooking times for the formulated fried egg are normally between 6.5 and 8 minutes. In addition, it is preferable to lower the cooking temperature and to increase the pH within the formulated fried egg to maximize quality. A cooking time of 6.5 to 8 minutes has been found to be adequate for coagulation of the egg proteins for the formulated fried egg.

In order to minimize skin formation during cooking, molds containing individual egg receiving areas are used. The molds containing the formulated egg prior to and during cooking are not required to be treated with oil and/or water. When no treatment is applied to the molds during cooking at relatively high temperatures, the firmness of the top layer of the egg is reduced. In addition, the cooking of the formulated fried egg without the use of oil, water, and/or other treatment may result in the undesirable dehydration and crusting of the egg surface and particularly the egg white surface.

During cooking of the formulated fried egg within the molds, edible oil may be sprayed upon the top surface of the egg to deter dehydration and crusting of the egg surface. The effectiveness of the sprayed oil upon the surface of the egg is improved when the formulated fried egg is cooked at lower temperatures of approximately 325° F. (162.78° C.).

Alternatively, water may be sprayed upon the top surface of the formulated fried egg within the molds during cooking to deter dehydration and crusting of the egg surface. The use of water sprayed upon the surface of the formulated fried egg yields the shiniest and most natural appearing fried egg.

In general, a continuous forced-draft convection heating oven is utilized for cooking of the formulated fried egg. A suitable forced-draft convection heating oven is identified as a Wolverine Proctor Convection Oven. The operational oven temperature parameters are usually identified as 325° F. to 475° F. (162.78° C. to 246.11° C.) where the dampers and relative humidity within the convection oven may be adjusted dependent upon the local environmental conditions as identified within the examples indicated herein.

During cooking, each mold may be covered with foil to minimize dehydration and crusting of the fried egg surface. Cooking of the formulated fried eggs within the molds covered by aluminum foil usually occurs at lower cooking temperatures of approximately 325° F. (162.78° C.). Prior to cooking in molds covered with aluminum foil, water may be added to each egg receiving area to minimize dehydration and/or crusting of the surface of the formulated fried egg during cooking The inclusion of water within the egg receiving area of the molds prior to covering with foil improves the humidity of the formulated fried egg during cooking, thereby reducing undesirable skin formation, dehydration, and/or crusting of the surface of the formulated fried egg.

The molds utilized to cook the formulated fried egg may identified as PROCTOR oven molds where each egg receiving area has a diameter of between 3 in. to 3.5 in., or 7.62 cm to 8.89 cm. Each mold may include one row of three egg receiving areas. Alternatively, a mold may include any desired number of rows of egg-receiving areas. In addition, the interior of the egg receiving areas of each mold may be treated with silicon and/or Teflon® to reduce sticking of the cooked formulated fried egg within the mold. Each egg receiving area of each mold is preferably constructed and arranged to hold between 8-14 grams of egg yolk material as deposited on 18-24 grams of egg white material.

A mold 10 having individual food receiving openings 12 may be inserted proximate to a dispensing device where each individual food opening 12 receives approximately 3 ounces or 85.05 grams of consumable food product.

The mold as utilized herein is preferably substantially circular in shape and has a sufficient depth to hold for cooking the mixed liquid egg whites and subsequent deposited mixed liquid egg yolk material.

Referring to FIG. 1, the mold may be formed of metal, Teflon®, and/or any other desired material for use in the processing, cooling, and/or freezing, of the formulated fried egg. The material selected for the mold 10 is required to be amenable to repeated cleansing to minimize food-related health issues and/or contamination. Each individual mold is generally adapted to receive 3 ounces or 85.05 grams of mixed liquid egg white material and 3 ounces or 85.05 grams of mixed liquid egg yolk material for cooking into the formulated fried egg product.

Following cooking, the molds containing the cooked formulated fried eggs may be removed from the oven and permitted to cool at room temperature for approximately 30 minutes. A cross-cup conveyor may then be used to transfer the molds to a freezing unit to implement freezing of the molds containing the formulated fried eggs.

The molds containing the cooked formulated fried eggs may be frozen in any manner desired including, but not necessarily limited to, freezing upon exposure to carbon dioxide snow; cryogenic freezing through the use of liquid nitrogen within a Spyro freezer; and/or freezing through convention freezing techniques. If a cryogenic freezing technique is utilized, then the Spyro freezer and associated conveyor may be set to freeze approximately 3800 units of formulated fried egg per hour. Freezing of the cooked molds holding the cooked formulated fried eggs may also occur through the use of a carbon dioxide freezing tunnel having a centrally disposed conveyor for transportation of the molds of cooked formulated fried eggs. Alternatively, liquid nitrogen may be used as the freezing medium, which may be either sprayed upon or exposed to the molds through conventional processing techniques. The use of liquid nitrogen is anticipated to be sufficient to freeze 3000 lbs. of cooked formulated fried eggs per hour.

Following cooking, the formulated fried eggs may be individually quick frozen. Individual quick freezing of the eggs should occur in a short duration of time.

Generally, as the time required for freezing ingredients decreases, the quality of the frozen article after thawing increases. A Spyro freezer may be utilized to individually quick freeze the formulated fried egg product. The throughput for the freezer may establish a freezing time of approximately 30 minutes. The formulated fried egg product may be exposed to a temperature below −10° F. (−23.33° C.), not to exceed 20° F. (−6.67° C.). Individual quick freezing of the cooked formulated fried egg product provides safety advantages that minimize food-related health and/or contamination issues. Following the individual quick freezing of the cooked formulated fried egg product, the fried eggs may endure being frozen, refrigerated, and/or kept hot following reheating for extended durations of time without the sacrifice of product quality.

The frozen formulated fried eggs may then be separated from the molds by conventional separation techniques, which may include the use of vacuum-assisted separation devices. Following separation from the molds, the frozen formulated fried eggs may be individually packaged and/or packaged in bulk for storage. The frozen formulated fried eggs may additionally be vacuum packaged and/or gaseous nitrogen may be utilized to flush air from the packages to minimize risk of contamination and/or freezer or thaw damage to the formulated fried eggs during storage.

Alternatively, the food separation device may include grasping arms and/or positioners to facilitate the separation of the cooked and frozen formulated fried egg from the interior of the respective mold. The food separation device may also include pneumatic and/or hydraulic pumps having hose conduits, which, in turn, may be in communication with one or more individual suction extractors. One or more valves may be utilized to regulate the pneumatic and/or hydraulic pressure on the individual suction devices for use in separation of the frozen formulated fried egg from an individual mold. The pumps and valves may regulate the pressure to be exposed to the individual extraction devices to downwardly force the individual extraction devices into the respective mold for separation of the frozen formulated fried egg product from the mold.

A conveyor may be placed below the food separation device. The conveyor is preferably adapted to receive, carry, and/or transport frozen formulated fried eggs to a packaging area following separation from the molds.

Prior to reheating of the frozen formulated fried eggs, thawing is generally required. Following the thawing of the previously frozen formulated fried eggs, the eggs may be reheated in a conventional oven or microwave oven prior to consumption. During reheating, the thawed formulated fried eggs are generally required to be covered or enclosed within a medium such as plastic to minimize dehydration, the formation of undesirable skin, and/or crusting of the surface of the fried egg. In addition, the power setting for a microwave oven should be reduced to minimize undesirable skin formation. Reheating through the use of a conventional oven generally also requires that the formulated fried eggs be covered to minimize undesirable skin formation, dehydration, and/or crusting of the surface of the eggs. Alternatively, humidity may be increased in the oven as earlier described to maximize the quality of the reheated formulated fried eggs. Alternatively, steam injection cooking may be utilized to reheat a thawed formulated fried egg, which may eliminate the necessity of covering the eggs or cooking wells containing the thawed formulated fried eggs during reheating.

Various ingredients are utilized to provide a desired quality for a composite formulated fried egg. Generally, the ingredients to be incorporated into the formulated fried egg include: egg yolk; xanthan gum; salt; corn syrup solids; citric acid; carrageenan; annatto; whole egg; hard cooked yolk; water; propylene glycol; egg whites; soy bean oil; modified food starch; ProMix (non-fat dry milk and whey solids); POLAR GEL modified food starch; SLS (sodium lauryl sulfate); DELIGHT oil; guar gum; white pepper; and natural egg flavor. Further, the formulated fried egg product may include water, soy bean oil, corn oil, citric acid, and/or butter flavor. The ingredients described herein have been provided for illustrative purposes only; the product may include additional items found in this description or not previously identified.

Egg whites generally comprise between 50% and 99.5% of the total percent weight of the entire egg white portion of the formulated fried egg product. Water is generally provided in an amount between 0% and 10% of the total weight of the egg white portion. Soy bean oil and/or corn oil is usually provided in an amount between 0% and 10% as based upon the percentage of total weight for the egg white portion. Modified food starch generally makes up between 0% to 3% of the total weight of the egg white portion. ProMix or non-fat dried milk and whey solids generally make up between 0% to 3% of the total weight of the egg white portion. Salt generally makes up between 0% to 1% of the total weight of the egg white portion. Xanthan gum generally makes up between 0% to 0.4% of the total weight of the egg white portion. POLAR GEL modified food starch generally makes up between 0% to 3% of the total weight of the egg white portion. Citric acid generally makes up between 0% to 0.2% of the total weight of the egg white portion. SLS generally makes up between 0% to 0.4% of the total weight of the egg white portion. DELIGHT oil generally makes up between 0% to 2.5% of the total weight of the egg white portion. Guar gum generally makes up between 0% to 0.3% of the total weight of the egg white portion. Propylene glycol generally makes up between 0% and 0.3% of the total weight of the egg white portion. White pepper generally makes up between 0% to 0.05% of the total weight of the egg white portion. Natural egg flavor generally makes up between 0% and 0.1% of the total weight of the egg white portion.

Egg yolks generally comprise between 50% to 99.9% of the total weight of the egg yolk portion of the formulated fried egg product. Xanthan gum generally makes up between 0% to 0.5% of the total weight of the egg yolk portion. Salt generally makes up between 0% to 0.4% of the total weight of the egg yolk portion. Citric acid generally makes up between 0% to 0.15% of the total weight of the egg yolk portion. Carrageenan generally makes up between 0% to 0.3% of the total weight of the egg yolk portion. Whole egg generally makes up between 0% to 50% of the total weight of the egg yolk portion. Hard-cooked egg yolk generally makes up between 0% to 45% of the total weight of the egg yolk portion. Water generally makes up between 0% to 15% of the total weight of the egg yolk portion. Propylene glycol generally makes up between 0% to 0.1% of the total weight of the egg yolk portion, and egg whites generally make up between 0% to 20% of the total weight of the egg yolk portion.

A typical formula for the egg white portion utilized within the formulated fried egg product would involve the use of egg whites constituting 81% of the total weight of the egg white portion of the fried egg product; water comprising 10% of the total weight of the egg white portion of the fried egg product; soy bean oil/corn oil constituting 4% of the total weight of the egg white portion of the fried egg product; modified food starch being 2.5% of the total weight of the egg white portion of the fried egg product; ProMix 632 (non-fat dry milk and whey solids) constituting 2% of the total weight of the egg white portion of the fried egg product; salt in the amount 0.35% of the total weight of the egg white portion of the fried egg product; and xanthan gum in the amount of 0.15% of the total weight of egg white portion of the fried egg product.

An alternative formula for the egg white portion would include egg whites being 85.9% of the total weight of the egg white portion of the fried egg product; water being 7.15% of the total weight of the egg white portion of the fried egg product; soy bean oil being 4% of the total weight of the egg white portion of the fried egg product; modified food starch being 2.5% of the total weight of the egg white portion of the fried egg product; salt being 0.35% of the total weight of the egg white portion of the fried egg product; and citric acid being 0.1% of the total weight of the egg white portion of the fried egg product.

Another alternative formula for the egg white portion would include egg whites in the amount of 93.15% of the total weight of the egg white portion of the fried egg product; soy bean oil in the amount of 4% of the total weight of the egg white portion of the fried egg product; modified food starch in the amount of 2.5% of the total weight of the egg white portion of the fried egg product; and salt in the amount of 0.35% of the total weight of the egg white portion of the fried egg product.

In still another formula, the egg white portion would include the use of egg whites in the amount of 97.15% of the total weight of the egg white portion of the fried egg product; modified food starch in the amount of 2.5% of the total weight of the egg white portion of the fried egg product; and salt in the amount of 0.35% of the total weight of the egg white portion of the formulated fried egg product.

In an alternative formula, egg whites would form 91.65% of the total weight of the egg white portion of the formulated fried egg product; soy bean oil would constitute 6% of the total weight of the egg white portion of the formulated fried egg product; POLAR GEL modified food starch would constitute 2% of the total weight of the egg white portion of the formulated fried egg product; salt would constitute 0.35% of the total weight of the egg white portion of the formulated fried egg product; and xanthan gum would constitute 0.3% of the total weight of the egg white portion of the formulated fried egg product.

In another alternative formula, egg whites would form 83% of the total weight of the egg white portion of the formulated fried egg product; water would constitute 10% of the total weight of the egg white portion of the fried egg product; soy bean oil would constitute 4% of the total weight of the egg white portion of the formulated fried egg product; modified food starch would constitute 2.5% of the total weight of the egg white portion of the formulated fried egg product; xanthan gum would constitute 0.15% of the total weight of the egg white portion of the formulated fried egg product; and salt would constitute 0.35% of the total weight of the egg white portion for the formulated fried egg product.

In another alternative formula, egg whites would form 85.65% of the total weight of the egg white portion of the formulated fried egg product; soy bean oil would constitute 5% of the total weight of the egg white portion of the formulated fried egg product; water would constitute 7% of the total weight of the egg white portion of the formulated fried egg product; modified food starch would constitute 2% of the total weight of the egg white portion of the formulated fried egg product; and salt would constitute 0.35% of the total weight of the egg white portion of the formulated fried egg product.

In yet another formula, egg whites would form 86% of the total weight of the egg white portion of the formulated fried egg product; water would constitute 7.15% of the total weight of the egg white portion of the formulated fried egg product; soy bean oil would constitute 4% of the total weight of the egg white portion of the formulated fried egg product; modified food starch would constitute 2.5% of the egg white portion of the formulated fried egg product; and salt would constitute 0.35% of the egg white portion of the formulated fried egg product.

In yet another alternative formula, egg whites would form 89.1% of the total weight of the egg white portion of the formulated fried egg product; soy bean oil would constitute 8% of the total weight of the egg white portion of the formulated fried egg product; POLAR GEL modified food starch would constitute 2.5% of the total weight of the egg white portion of the formulated fried egg product; and salt would constitute 0.4% of the total weight of the egg white portion of the formulated fried egg product.

In yet another alternative formula, egg whites would form 91.1% of the total weight of the egg white portion of the formulated fried egg product; soy bean oil would constitute 6% of the total weight of the egg white portion of the formulated fried egg product; POLAR GEL modified food starch would constitute 2.5% of the total weight of the egg white portion of the formulated fried egg product; and salt would constitute 0.4% of the total weight of the egg white portion of the formulated fried egg product.

In yet another alternative formula, egg whites would form 92.45% of the total weight of the egg white portion of the formulated fried egg product; soy bean oil would constitute 6% of the total weight of the egg white portion of the formulated fried egg product; POLAR GEL modified food starch would constitute 1% of the total weight of the egg white portion of the formulated fried egg product; salt would constitute 0.4% of the total weight of the egg white portion of the formulated fried egg product; and xanthan gum would constitute 0.15% of the total weight of the egg white portion of the formulated fried egg product.

In yet another alternative formula, egg whites would form 99.25% of the total weight of the egg white portion of the formulated fried egg product; POLAR GEL modified food starch would constitute 0.5% of the total weight of the egg white portion of the formulated fried egg product; and xanthan gum would constitute 0.25% of the total weight of the egg white portion of the formulated fried egg product.

In yet another alternative formula, egg whites would form 98.88% of the total weight of the egg white portion of the formulated fried egg product; POLAR GEL modified food starch would constitute 1% of the total weight of the egg white portion of the formulated fried egg product; and xanthan gum would constitute 0.13% of the total weight of the egg white portion of the formulated fried egg product.

In yet another alternative formula, egg whites would form 87.1% of the total weight of the egg white portion of the formulated fried egg product; soy bean oil would constitute 10% of the total weight of the egg white portion of the formulated fried egg product; POLAR GEL modified food starch would constitute 2.5% of the total weight of the egg white portion of the formulated fried egg product; and salt would constitute 0.4% of the total weight of the egg white portion of the formulated fried egg product.

In yet another alternative formula, egg whites would form 90.55% of the total weight of the egg white portion of the formulated fried egg product; soy bean oil would constitute 8% of the total weight of the egg white portion of the formulated fried egg product; POLAR GEL modified food starch would constitute 1% of the total weight of the egg white portion of the formulated fried egg product; salt would constitute 0.4% of the total weight of the egg white portion of the formulated fried egg product; and xanthan gum would constitute 0.05% of the total weight of the egg white portion of the formulated fried egg product.

In yet another alternative formula, egg whites would form 89.1% of the total weight of the egg white portion of the formulated fried egg product; soy bean oil would constitute 9% of the total weight of the egg white portion of the formulated fried egg product; POLAR GEL modified food starch would constitute 1.5% of the total weight of the egg white portion of the formulated fried egg product; and salt would constitute 0.4% of the total weight of the egg white portion for the formulated fried egg product.

In yet another alternative formula, egg whites would form 90.05% of the total weight of the egg white portion of the formulated fried egg product; soy bean oil would constitute 8% of the total weight of the egg white portion of the formulated fried egg product; POLAR GEL modified food starch would constitute 1.5% of the total weight of the egg white portion of the formulated fried egg product; salt would constitute 0.4% of the total weight of the egg white portion of the formulated fried egg product; and xanthan gum would constitute 0.05% of the total weight of the egg white portion of the formulated fried egg product.

In yet another alternative formula, egg whites would form 91.6% of the total weight of the egg white portion of the formulated fried egg product; soy bean oil would constitute 8% of the total weight of the egg white portion of the formulated fried egg product; and salt would constitute 0.4% of the total weight of the egg white portion of the formulated fried egg product.

In yet another alternative formula, egg whites would form 99% of the total weight of the egg white portion of the formulated fried egg product; and SDS (sodium dodecyl sulfate) would constitute 1% of the total weight of the egg white portion of the formulated fried egg product.

In yet another alternative, egg whites would form 99.5% of the total weight of the egg white portion of the formulated fried egg product; and SDS would constitute 0.5% of the total weight of the egg white portion of the formulated fried egg product.

In yet another alternative formula, egg whites would form 99.9% of the total weight of the egg white portion of the formulated fried egg product; and SDS would constitute 0.1% of the total weight of the egg white portion of the formulated fried egg product.

In yet another alternative formula, egg whites would form 94.25% of the total weight of the egg white portion of the formulated fried egg product; soy bean oil would constitute 4% of the total weight of the egg white portion of the formulated fried egg product; POLAR GEL modified food starch would constitute 1.25% of the total weight of the egg white portion of the formulated fried egg product; salt would constitute 0.4% of the total weight of the egg white portion of the formulated fried egg product; and SLS would constitute 0.1% of the total weight of egg white portion of the formulated fried egg product.

In yet another alternative formula, egg whites would form 94.25% of the total weight of the egg white portion of the formulated fried egg product; soy bean oil would constitute 2% of the total weight of the egg white portion of the formulated fried egg product; DELIGHT oil would constitute 2% of the total weight of the egg white portion of the formulated fried egg product; POLAR GEL modified food starch would constitute 1.25% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula, egg whites would form 93% of the total weight of the egg white portion of the formulated fried egg product; DELIGHT oil would constitute 2% of the total weight of the egg white portion of the formulated fried egg product; soy bean oil would constitute 2% of the total weight of the egg white portion of the formulated fried egg product; POLAR GEL modified food starch would constitute 2.5% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula, egg whites would form 94% of the total weight of the egg white portion of the formulated fried egg product; DELIGHT oil would constitute 2% of the total weight of the egg white portion of the formulated fried egg product; soy bean oil would constitute 2% of the total weight of the egg white portion of the formulated fried egg product; POLAR GEL modified food starch would constitute 1.25% of the total weight of the egg white portion of the formulated fried egg product; salt would constitute 0.4% of the total weight of the egg white portion of the formulated fried egg product; and SLS would constitute 0.35% of the total weight of the egg white portion of the formulated fried egg product.

In yet another alternative formula, egg whites would form 95.5% of the total weight of the egg white portion of the formulated fried egg product; DELIGHT oil would constitute 2% of the total weight of the egg white portion of the formulated fried egg product; soy bean oil would constitute 2% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula, egg whites would form 94.25% of the total weight of the egg white portion of the formulated fried egg product; water would constitute 4% of the total weight of the egg white portion of the formulated fried egg product; POLAR GEL modified food starch would constitute 1.25% of the total weight of the egg white portion of the formulated fried egg product; salt would constitute 0.4% of the total weight of the egg white portion of the formulated fried egg product; and SLS would constitute 0.1% of the total weight of the egg white portion of the formulated fried egg product.

In yet another alternative formula, egg whites would form 85.6% of the total weight of the egg white portion of the formulated fried egg product; water would constitute 10% of the total weight of the egg white portion of the formulated fried egg product; non-fat dry milk would constitute 1% of the total weight of the egg white portion of the formulated fried egg product; PURITY W modified food starch would constitute 2% of the total weight of the egg white portion of the formulated fried egg product; salt would constitute 0.4% of the total weight of the egg white portion of the formulated fried egg product; and natural flavor for fried egg would constitute 1% of the total weight of the egg white portion of the formulated fried egg product.

A formula for the egg yolk portion of the formulated fried egg product would constitute egg yolks forming 99.57% of the total weight of the egg yolk portion of the formulated fried egg product; xanthan gum would form 0.225% of the total weight of the egg yolk portion of the formulated fried egg product; and salt would constitute 0.4% of the total weight of the egg yolk portion of the formulated fried egg product.

In yet another formula, egg yolks would form 50% of the total weight of the egg yolk portion of the formulated fried egg product; whole egg would constitute 49.55% of the total weight of the egg yolk portion of the formulated fried egg product; and xanthan gum would form 0.45% of the total weight of the egg yolk portion of the formulated fried egg product.

In yet another formula, egg yolks would form 50.05% of the total weight of the egg yolk portion of the formulated fried egg product; hard-cooked yolk would constitute 39.83% of the total weight of the egg yolk portion of the formulated fried egg product; water would constitute 10% of the total weight of the egg yolk portion of the formulated fried egg product; xanthan gum would constitute 0.05% of the total weight of the egg yolk portion of the formulated fried egg product; propylene glycol would constitute 0.05% of the total weight of the egg yolk portion of the formulated fried egg product; and citric acid would constitute 0.02% of the egg yolk portion of the formulated fried egg product.

In yet another formula, egg yolks would form 79.9% of the total weight of the egg yolk portion of the formulated fried egg product; egg whites would constitute 19.5% of the total weight of the egg yolk portion of the formulated fried egg product; xanthan gum would constitute 0.25% of the total weight of the egg yolk portion of the formulated fried egg product; carrageenan would constitute 0.25% of the total weight of the egg yolk portion of the formulated fried egg product; and citric acid would constitute 0.1% of the total weight of the egg yolk portion of the formulated fried egg product.

The procedures identified herein enable individual formulated fried eggs to be held frozen, refrigerated and/or hot for extended periods of time without loss of product integrity.

The temperature of the formulated fried egg within the mold 10 following freezing is verified to not exceed 36° F. (2.22° C.). The frozen formulated fried eggs may then be packaged in poly-lined bags and stored in a freezer for future transportation, delivery, reheating, and consumption by an individual.

EXAMPLES

Example I

Initially, shell eggs were broken and separated into liquid egg yolk portions and liquid egg white portions by commercial egg shelling and separation techniques. 600.6 grams of liquid egg yolk were placed into a mixing vessel. Next, 120 mL of cold water were combined with 477.96 grams of hard-cooked egg yolk in a mixer where mixing occurred. Next, 0.6 grams of propylene glycol were combined with 0.6 grams of xanthan gum in a bucket where mixing occurred through use of a whisk. Next, 0.24 grams of citric acid were added to the glycol/gum mixture and mixed. The mixed glycol/gum/citric acid mixture and water/hard-cooked egg yolk mixture were added to the liquid egg yolk where agitation occurred. The mixed yolk portion was then transferred to a heat exchanger for preheating to a temperature just below the yolk coagulation point. The preheated liquid egg yolk portion was then pumped to a yolk depositor.

3,753.6 grams of egg whites were added to a mixing vessel. Next, 120 mL of hot water were combined with 80 grams of modified food starch and mixed. Next, 8 grams of propylene glycol and 4 grams of xanthan gum were added to a bucket and mixed with a whisk. The glycol/gum mixture was then added to the water/starch mixture where mixing occurred. The resulting mixture was combined with the liquid egg whites where mixing occurred.

The liquid egg white portion was then transferred to a heat exchanger for preheating. The preheated liquid egg white portion was then pumped to an egg white depositor for placement within a plurality of molds. The molds containing the preheated liquid egg white portion were then exposed to heat of approximately 325° F. or 162.78° C. The mold was then transferred to a yolk depositor and a desired volume of preheated egg yolk was deposited upon the heated egg white portion. The molds containing the egg white portion and egg yolk portion were then moved to a convection oven where cooking occurred for 7.75 minutes at a temperature of 325° F. or 162.78° C. with the humidity set at full steam with the dampers closed. Following cooking, the molds were transferred to a cooling area where the molds were permitted to cool at room temperature for a period of 30 minutes. Next, the cooled molds of formulated fried eggs were transferred to a cryogenic Spyro freezer for quick freezing. Following freezing, the frozen formulated fried eggs were separated from the molds for packaging and storage. Next, the packaged frozen formulated fried eggs were thawed and reheated in a microwave oven at a low power setting; before reheating, the formulated fried eggs were covered with microwave-compatible plastic to prevent dehydration, skin formation, and/or crusting. The formulated fried obtained according to the above-identified methodology provided a superior formulated fried egg resembling a natural fried egg in appearance, taste, and mouth feel.

Example II

Initially, shell eggs were broken and separated into liquid egg yolk portions and liquid egg white portions by commercial egg shelling and separation techniques. 958.8 grams of liquid egg yolk were added to a mixing vessel. Next, 234 grams of egg whites were combined with 2.99 grams of xanthan gum and 2.99 grams of carrageenan whereupon mixing occurred. Next, 1.20 grams of citric acid were added to the egg white/gum/carrageenan mixture whereupon mixing occurred. The resulting mixture was then added to the liquid egg yolk where agitation occurred. The mixed yolk portion was then transferred to a heat exchanger for preheating to a temperature just below the yolk coagulation point. The preheated liquid egg yolk portion was then pumped to a yolk depositor.

2,430 grams of liquid egg whites were added to a mixing vessel. Next, 62.5 grams of POLAR GEL modified food starch were combined with 5 grams of xanthan gum and 2.5 grams of citric acid and mixed. The mixed POLAR GEL modified food starch/gum/citric acid was then added to the liquid egg yolks where mixing occurred. The liquid egg white portion was then transferred to a heat exchanger for preheating. The preheated liquid egg white portion was then pumped to an egg white depositor where placement within a plurality of molds occurred. The molds containing the preheated liquid egg white portions were then exposed to heat of approximately 375° F. or 190.56° C. The molds were then transferred to a yolk depositor where a desired volume of egg yolk was deposited upon the egg white portion. The molds containing the egg white portion and egg yolk portion were then transferred to a convection oven and cooked for 6.5 minutes at a temperature of 375° F. or 190.56° C. with the humidity set at full steam with the oven dampers closed. Following cooking, the molds were transferred to a cooling area where the molds were cooled at room temperature for a period of 30 minutes. Next, the cooled molds of formulated fried eggs were transferred to a cryogenic Spyro freezer for quick freezing. Following freezing, the formulated fried eggs were separated from the molds for packaging and storage. Next, the frozen formulated fried eggs were thawed and reheated in a microwave oven at a low power setting; before reheating, the formulated fried eggs were covered with microwave-compatible plastic to prevent dehydration, skin formation, and/or crusting. The formulated fried eggs obtained according to the above-identified methodology provided a superior formulated fried egg resembling a natural fried egg in appearance, taste, and mouth feel.

Example III

Initially, shell eggs were broken and separated into liquid egg yolk portions and liquid egg white portions by commercial egg shelling and separation techniques. 500 grams of liquid egg yolk were added to a mixing vessel. Next, 495.5 grams of whole egg and 4.5 grams of xanthan gum were placed in a mixing vessel and mixed. The mixed whole egg and gum were then added to the liquid egg yolk where mixing occurred. The mixed yolk portion was then transferred to a heat exchanger for preheating to a temperature just below the yolk coagulation point. The preheated liquid egg yolk portion was then pumped to a yolk depositor.

890.5 grams of liquid egg whites were added to a mixing vessel. Next, 80 grams of soy bean oil, 25 grams of POLAR GEL modified food starch, 5 grams of salt, and 0.5 grams of xanthan were added to a mixing vessel and mixed. The mixed oil/gel/salt/gum was then added to the liquid egg whites where mixing occurred. The liquid egg white portion was then transferred to a heat exchanger for preheating. The preheated liquid egg white portion was then pumped to an egg white depositor where placement within a plurality of molds occurred. The molds containing the preheated liquid egg white portions were then exposed to heat of approximately 375° F. or 190.56° C. The molds were then transferred to a yolk depositor where a desired volume of egg yolk was placed upon the egg white portion within the mold. The molds containing the egg white portion and egg yolk portion were then transferred to a convection oven and cooked for 6.5 minutes at a temperature of approximately 375° F. or 190.56° C. where full steam was provided for the final one-third of the cooking time. The oven dampers were closed during the final one-third of the cooking time to maximize humidity. Following cooking, the molds containing the cooked formulated fried eggs were transferred to a cooling area and cooled at room temperature for a period of 30 minutes. Next, the cooled molds of formulated fried eggs were transferred to a cryogenic SPYRO freezer for quick freezing. Following freezing, the frozen formulated fried eggs were separated from the molds for packaging and storage. Next, the packaged frozen formulated fried eggs were thawed and reheated in a microwave oven at a low power setting; before reheating, the formulated fried eggs were covered with microwave-compatible plastic to prevent dehydration, skin formation, and/or crusting. The formulated fried eggs obtained according to the above-identified methodology provided a superior formulated fried egg resembling a natural fried egg in appearance, taste, and mouth feel.

The above-identified ingredients, temperature, and processing procedures resulted in a formulated fried egg having increased thickness, improved color, texture, mouth feel, and the overall appearance of a naturally fried egg.

It should be noted that the process steps identified above may be substantially interchanged and modified without sacrifice as to the final formulated fried egg so long as temperature is regulated and mixing time is regulated to avoid excessive temperatures and over-mixing.

In general, the ingredients identified herein have been provided for illustrative purposes and should not be considered as restrictive. In addition, reference herein to modified food starch may generally include a wide variety of commercially available corn starches and/or potato starches that are FDA-approved for consumption by individuals. In addition, certain sugars may be used as substitutes for or in combination with either of the modified food starches identified herein. Further, reference herein to soy oil and/or corn oil may include reference to other edible oils, namely peanut oil and vegetable oils. It should also be noted that a number of alternative edible oils may adequately function as substitute ingredients for soy bean oil and/or corn oil herein.

Carboxymethylcellulose, carrageenan, guar gums, locust bean gum, beta carotene, agar, glycerol mono stearate, mono diglycerides and polypropylene glycol esters may function as acceptable substitutes and/or replacements for the xanthan gum and the gums and emulsifiers herein. Further, other milk products may be substituted for the non-fat dry milk and whey as used herein.

It should be noted that the percentage weights provided herein have been rounded mathematically, which in some instances may not exactly equal 100%. In these instances, the percentage of eggs and/or water may be insignificantly increased or decreased to provide a 100% summation.

The above examples and disclosure are intended to be illustrative and not exhaustive. These examples and description will suggest many variations and alternatives to one of ordinary skill in the art. All of these alternatives and variations are intended to be included within the scope of the attached claims. Those familiar with the art may recognize other equivalents to the specific embodiments described herein which equivalents are also intended to be encompassed by the claims attached hereto.

The present invention may be embodied in other specific forms without departing from the spirit or essential attributes thereof; therefore, the illustrative embodiments should be considered in all respects as illustrative and not restrictive, reference being made to dependent claims rather than to the foregoing description to indicate the scope of the invention.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim that follows should be taken as alternatively written in a multiple dependent form from all prior claims that possess all antecedents referenced in such dependent claim if such multiple dependent format is an accepted format within the jurisdiction (e.g., each claim depending directly from claim 1 should be alternatively taken as depending from all previous claims). In jurisdictions where multiple dependent claim formats are restricted, the following dependent claims should also be taken as alternatively written in each singly dependent claim format, which creates a dependency from a prior antecedent-possessing claim other than the specific claim listed in such dependent claim below (e.g., claim 3 may be taken as alternatively dependent from claim 2; claim 4 may be taken as alternatively dependent on claim 2, or on claim 3; claim 6 may be taken as alternatively dependent from claim 5; etc.).

This completes the description of the preferred and alternate embodiments of the invention. Those skilled in the art may recognize other equivalents to the specific embodiment described herein, which equivalents are intended to be encompassed by the claims attached hereto.

That which is claimed is:

1. A method for making a formulated fried egg, the formulated fried egg comprising 1) an egg white portion that comprises from about 50% to 99.5% by weight egg white and salt and 2) an egg yolk portion that comprises from about 50% to 99.9% by weight egg yolk and gum, said method comprising the steps of:
   a) separately preheating an egg white composition and an egg yolk composition;
   b) transferring the preheated egg white composition to an egg white depositor;
   c) transferring the preheated egg yolk composition to an egg yolk depositor;
   d) positioning a mold to receive an aliquot of said egg white composition from said egg white depositor;
   e) positioning the mold containing the egg white composition to receive from the egg yolk depositor an aliquot of said egg yolk composition on the egg white composition;
   f) heating the mold and its contents so as to cook said contents, thereby providing in said mold said formulated fried egg that comprises the egg white portion and the egg yolk portion;
   g) transferring the mold containing the formulated fried egg to a freezer so as to provide a frozen formulated fried egg; and
   h) separating the frozen fried egg from the mold.

2. The method of making a formulated fried egg according to claim 1 wherein the egg white composition is degassed.

3. The method of making a formulated fried egg according to claim 1 wherein at least a portion of heating step (f) is performed in a high-moisture atmosphere.

4. The method of making a formulated fried egg according to claim 1 wherein the egg white portion further comprises modified food starch.

5. The method of making a formulated fried egg according to claim 1 wherein the egg yolk portion further comprises citric acid.

6. The method of making a formulated fried egg of claim 1 wherein the egg white portion further comprises gum.

7. The method of making a formulated fried egg of claim 1 wherein the egg yolk portion further comprises salt.

8. The method of making a formulated fried egg of claim 1 wherein said mold comprises a plurality of depressions for receiving said aliquots of egg white and egg yolk compositions.

9. The method of making a formulated fried egg according to claim 1 further comprising cooling said mold before said transferring step.

10. The method of making a formulated fried egg according to claim 1 further comprising packaging the frozen formulated fried egg.

11. The method of making a formulated fried egg according to claim 1 wherein said heating step is performed for from 5.5 to 8 minutes in an oven set at from 325° to 425° F.

12. The method of making a formulated fried egg according to claim 11 wherein steam is introduced to said oven for at least a portion of the heating time.

13. A continuous process for producing multiple fried egg products that comprises a formulated egg white portion and a formulated egg yolk portion, said process employing a device that comprises multiple liquid depositors and a conveying system bearing a plurality of cooking molds that comprise multiple receptacles, said process comprising:
   a) providing to separate depositors preheated fluid egg white and egg yolk compositions;
   b) depositing aliquots of said egg white composition into receptacles of a series of said molds borne by said conveying system;
   c) depositing an aliquot of said egg yolk composition on each of said aliquots of egg white composition;
   d) conveying said molds to an oven set at a temperature of from 325° to 425° F. and permitting each mold to be heated for a time of 5.5 to 8 minutes, thereby providing multiple fried egg products in said receptacles;
   e) conveying said molds to an area where said fried egg products are frozen; and
   f) removing said frozen fried egg products from said receptacles.

14. The process of claim 13 further comprising permitting said molds to cool for up to 30 minutes before said transferring step.

15. The process of claim 13 wherein said oven comprises introduced humidity during at least a portion of the heating time.

16. The process of claim 13 wherein said oven comprises introduced humidity throughout the heating time.

17. The process of claim 13 wherein said oven is adapted to permit delivery of at least one of edible oil and water to the tops of the receptacle contents during said heating.

18. The process of claim 13 wherein said fluid egg white composition comprises liquid egg white which is degassed and has a pH of 8.8 to 9.1.

19. The process of claim 13 wherein said oven is set at a temperature of from 325° to 375° and the heating time is from 6.5 to 8 minutes.

20. The process of claim 13 further comprising packaging said frozen fried egg products.

\* \* \* \* \*